(12) United States Patent
Sundkvist

(10) Patent No.: US 6,874,790 B2
(45) Date of Patent: Apr. 5, 2005

(54) DEVICE FOR ROTATING DISC-SHAPED OBJECTS

(75) Inventor: Daniel Sundkvist, Bromma (SE)

(73) Assignee: Alpha Sweden AB, Sudbyberg (SE)

( * ) Notice: Subject to any disclaimer, the term of this patent is extended or adjusted under 35 U.S.C. 154(b) by 0 days.

(21) Appl. No.: 10/724,868

(22) Filed: Dec. 2, 2003

(65) Prior Publication Data

US 2004/0130104 A1 Jul. 8, 2004

(30) Foreign Application Priority Data

Dec. 3, 2002 (SE) ............................................. 0203579

(51) Int. Cl.$^7$ ........................................... B23B 31/103
(52) U.S. Cl. ..................... 279/35; 279/106; 279/117; 279/125; 279/140
(58) Field of Search ......................... 279/35, 71, 106, 279/109, 117, 125, 129, 130, 131, 140

(56) References Cited

U.S. PATENT DOCUMENTS

| | | | | | |
|---|---|---|---|---|---|
| 938,873 A | * | 11/1909 | Kleber | .......................... | 279/117 |
| 2,207,621 A | * | 7/1940 | Hite | ............................ | 279/110 |
| 2,444,457 A | * | 7/1948 | Marks et al. | ............... | 359/812 |
| 2,493,574 A | * | 1/1950 | Durkee | .......................... | 82/165 |
| 2,593,706 A | * | 4/1952 | Von Zelewsky | ............. | 279/33 |
| 3,952,384 A | * | 4/1976 | Goldry et al. | ................ | 294/88 |
| 4,819,527 A | * | 4/1989 | Redman | ....................... | 82/165 |
| 5,074,176 A | * | 12/1991 | Redman et al. | ............... | 82/165 |
| 6,364,320 B1 | * | 4/2002 | Domken | ..................... | 279/107 |

* cited by examiner

Primary Examiner—Daniel W. Howell
Assistant Examiner—Ali Abdelwahed
(74) Attorney, Agent, or Firm—Nixon & Vanderhye

(57) ABSTRACT

A device for rotation of disc-shaped elements of different diameter, such as matrices for manufacturing audio and video discs. The device comprises a rotatable chuck (10) in which three arms (20) distributed evenly in the peripheral direction are pivotably mounted, the arms having a radially outer stop element (22) for contact with an outer peripheral edge of a disc element inserted in the chuck. The chuck has a rotatably mounted central gearwheel (18) which is preloaded by the tension spring elements (28) towards a rotational position in which the central gearwheel (18) tends to hold the arms (20) and their stop elements (22) in a pivoted-in position in the chuck. The arms (20) are synchronously pivotable towards a pivoted-out position counter to the action of the tension spring elements (28). The device comprises a retaining mechanism (30–40) which is configured to lock the rotation of the central gearwheel (18) relative to the base plate (16) when a predetermined speed of the chuck (10) is reached.

4 Claims, 2 Drawing Sheets

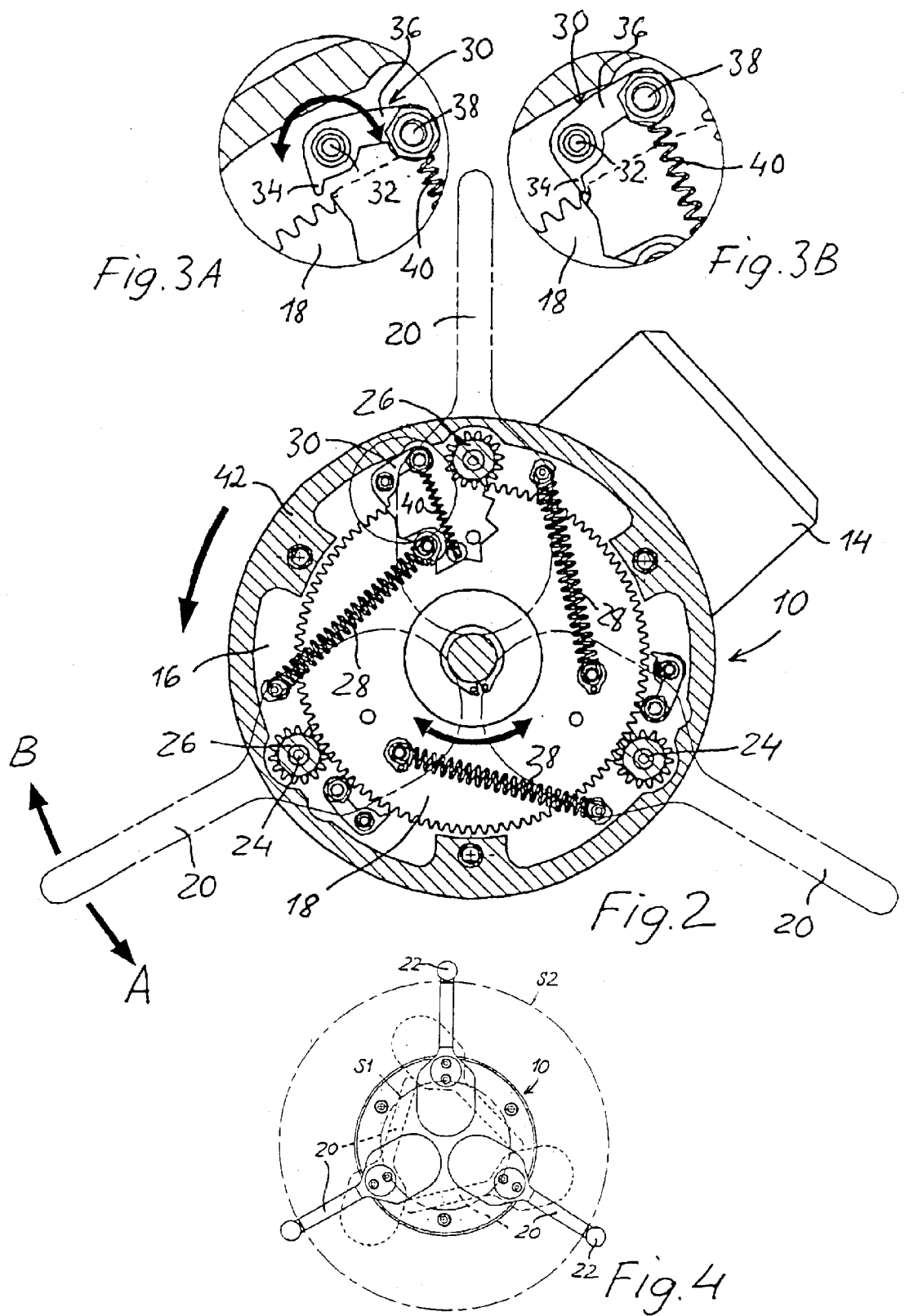

DEVICE FOR ROTATING DISC-SHAPED OBJECTS

TECHNICAL FIELD

The present invention relates to a device for rotation of disc-shaped elements of different diameter, such as matrices for manufacturing audio and video discs. The invention relates in particular, but not exclusively, to a device for spin-drying such disc elements, the device comprising a chuck which can be rotated by means of a motor-driven spindle and in which three arms distributed evenly in the peripheral direction are pivotably mounted, the said arms having a radially outer stop element for contact with an outer peripheral edge of a disc element inserted in the chuck, and the chuck having a base plate which is connected in a rotationally fixed manner to the spindle and in which each arm is mounted rotatably via a respective pin which, via a gearwheel mounted thereon, is in engagement with a central gearwheel which is mounted rotatably in the base plate and is preloaded by means of tension spring elements towards a rotational position in which the central gearwheel tends to hold the arms and their stop elements in a pivoted-in position in the chuck, the arms being synchronously pivotable towards a pivoted-out position counter to the action of the tension spring elements in order to receive and, while centring, clamp a disc element in the chuck in order for it to be possible to subject the disc element to rapid rotation therein.

BACKGROUND OF THE INVENTION

For drying, for example, matrix discs after electroplating and liquid-treatment, use is made of spinning chucks of the kind mentioned above. Such matrices of the kind commonly used are thin and have a diameter which varies between roughly 100 and 255 mm and often have a very uneven outer peripheral edge, which results in the centre of gravity of the matrix not always coming to lie in the centre of rotation of the spinning chuck in which the matrix is clamped. This in turn means that the synchronously movable arms of the chuck can be opened when one or more of the arms are, when the chuck is rotated rapidly, subjected to radially outwardly directed forces which exceed the spring force on the arms which secure the matrix in the chuck. This spring force, which acts on the arms via the central gearwheel and the individual gearwheels on the pivots of the arms, cannot be selected to be too great as it would otherwise deform the thin matrix discs. Spinning chucks of this known kind can therefore be rotated at only a relatively low, limited speed.

THE OBJECT AND SOLUTION OF THE INVENTION

It is an object of the present invention to produce a spinning chuck which, when a predetermined speed is exceeded, automatically activates a retaining means which immediately locks the matrix-holding position of the arms, which allows the chuck to be rotated at a considerably higher speed without in that connection damaging the clamped matrix disc.

To this end, the device referred to in the introduction is distinguished in that it is provided with a retaining mechanism which is designed to lock the rotation of the central gearwheel relative to the base plate when a predetermined speed of the chuck is reached.

According to a preferred embodiment of the device, the retaining mechanism comprises at least one retaining catch mounted in the chuck, which catch is preloaded towards a position not engaging with the central gearwheel and is arranged so as to be brought into locking engagement with the central gearwheel when the predetermined speed is exceeded.

In this connection, the retaining catch is suitably designed as a pivotable two-armed lever which has a first lever arm preloaded by means of a tension spring in a direction opposite to the centrifugal force, and a second lever arm which has a dog for engagement in tooth gaps of the central gearwheel, the catch being designed so as to be pivoted with its dog into locking engagement with the central gearwheel by the centrifugal force exerted on the first lever arm of the catch, counter to the action of the tension spring, when rotation of the chuck exceeding the predetermined speed takes place.

In order to guarantee secure and balanced locking of the central gearwheel, three retaining catches are distributed evenly in the peripheral direction in the chuck.

Further features of the device according to the invention will emerge in greater detail below with reference to accompanying drawings.

BRIEF DESCRIPTION OF THE DRAWINGS

FIG. 2 is a partly sectioned plan view of the chuck in FIG. 1;

FIGS. 3A and 3B are enlarged detailed views of the free position and, respectively, the locking position of the retaining catch, and FIG. 4 is a plan view of the chuck, where the arms are also shown in a folded-in position with broken lines.

DETAILED DESCRIPTION OF PREFERRED EMBODIMENT

Figure 1:
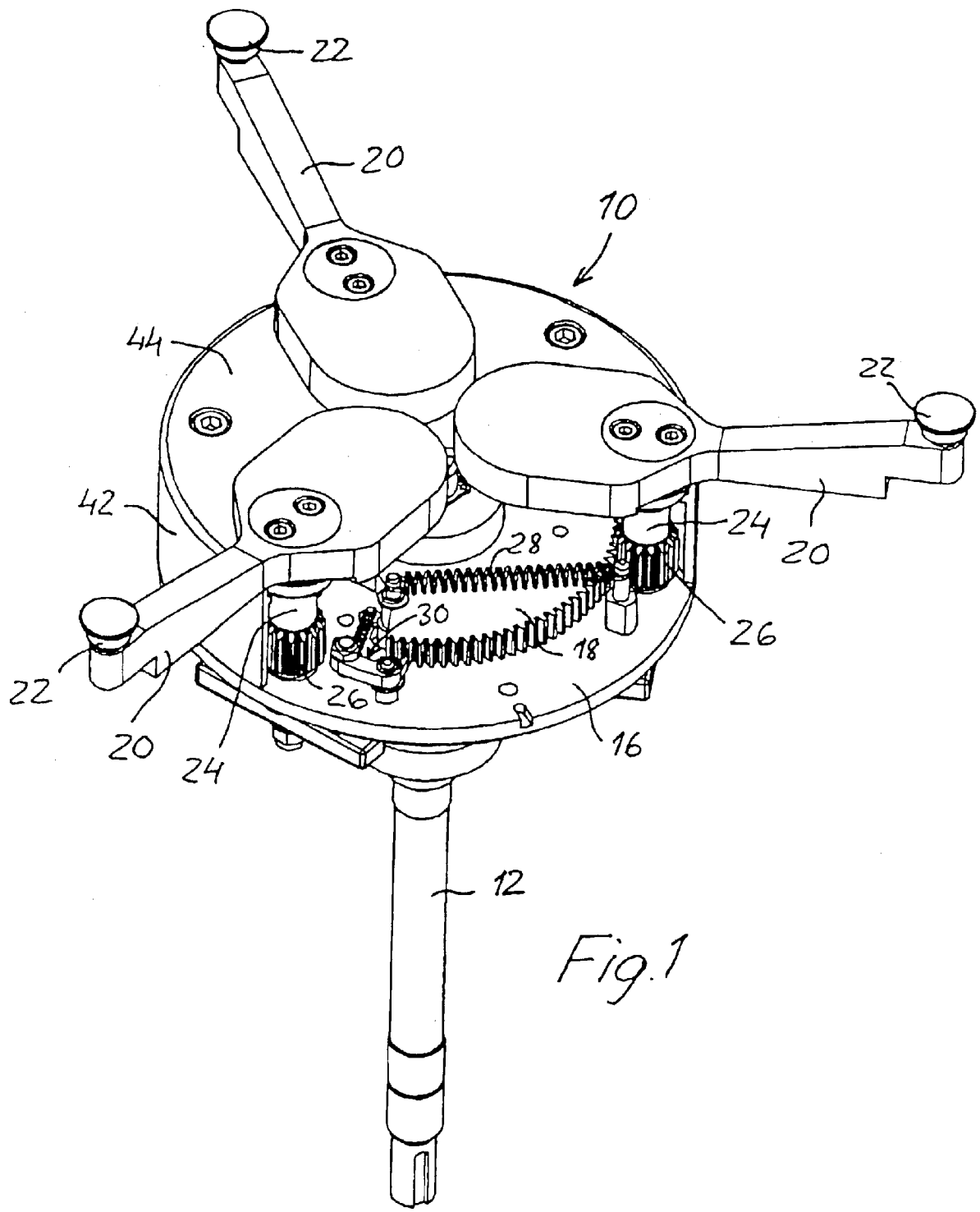
FIG. 1 is a perspective view of a spinning chuck according to the present invention.

In FIG. 1, a spinning chuck according to the invention for rotation of disc-shaped elements, especially for spin-drying thin disc matrices which are to be freed of liquid after having been in a rinsing or treatment bath, is designated generally by reference number 10. The chuck 10 comprises a spindle 12 which can be rotated by means of a motor 14 (FIG. 2). A base plate 16 is connected firmly to the spindle 12 and bears a large central gearwheel 18 which is mounted limitedly rotatably on the base plate 16. Three arms 20 distributed evenly in the peripheral direction, which have a stop element 22 at their outer end for contact with an outer peripheral edge of a disc element inserted in the chuck 10, are each mounted rotatably in the base plate 16 via a respective pivot 24 and each engage with the central gearwheel 18 by means of a respective gearwheel 26. The central gearwheel 18 is held preloaded towards a first rotational position relative to the base plate 16 by means of three tension springs 28, one end of which is anchored in the base plate 16 and the other end of which is fixed in the central gearwheel 18. In this first rotational position, the three arms 20 take up a folded-in position in the chuck, as shown by broken outlines in FIG. 4, the arms then being capable of gripping a disc element S1 of the smallest size with a diameter of, for example, roughly 100 mm.

When a disc element is inserted in the chuck 10, the arms 20 are pivoted out in the direction of the arrow A in FIG. 2. This pivoting-out of the arms 20 takes place at the same time and synchronously owing to the fact that the gearwheels 26 of the arms on the pivots 24 engage with the central gearwheel 18 and in that connection rotate the latter while the tension springs 28 are stretched. When the disc element has been inserted within the stop elements 22 on the arms 20, the tension springs 28, via the gearwheels 18 and 26, cause the arms to return in the direction of the arrow B in FIG. 2 to secure the disc element with adequate force, the disc element at the same time being centred in the chuck 10. The arms 20 can then grip a disc element S2 (FIG. 4) of the largest size with a diameter of, for example, roughly 255 mm. It is of course possible to dimension the chuck for even smaller and larger disc elements to be handled.

In order to bring about rapid and effective drying of thin matrix discs, it is desirable for it to be possible to rotate the discs at high speed in the chuck. This can, however, lead to the following problems:

a) if an imbalance occurs during rotation of the clamped matrix disc as a consequence of the centre of gravity of the disc not lying in the centre of rotation of the spinning chuck, which is often due to the peripheral edge of the disc being uneven, this can result in an increased centrifugal force being exerted on at least one of the arms, so that it, and thus the other arms, tend to open with the consequence that there is a risk of the matrix disc coming loose;

b) the air resistance which acts on the arms during rotation of the chuck tends to clamp the thin matrix disc excessively, with the consequence that the disc is deformed.

In order to prevent the problems mentioned above occurring, it is proposed according to the invention that the device is provided with a retaining mechanism which, when a predetermined speed of the chuck 10 is reached, locks the rotation of the central gearwheel 18 relative to the base plate 16.

The retaining mechanism according to the invention comprises at least one but, as shown in FIG. 2, preferably three retaining catches 30 distributed evenly in the peripheral direction. Each retaining catch 30 is designed as a two-armed lever (see FIGS. 3A, 3B) and is mounted rotatably in the base plate 16 on a pin 32. One, the shorter, arm of the catch 30 is designed as a dog 34, which is shaped so as to fit in the tooth gaps of the central gearwheel 18, while the other, longer arm 36 of the catch 30 has an outer attachment 38 for one end of a tension spring 40. The other end of this tension spring 40 is anchored firmly in a radially inner position on the base plate 16.

The retaining mechanism functions in the following way. When the chuck 10 with a matrix disc clamped therein has reached a predetermined speed, which is lower than a speed which could cause loosening of the disc element as a consequence of too great an imbalance thereof or alternatively cause deformation of the disc as a consequence of too great an air resistance on the arms, the centrifugal force exerted on the other arm 36 of the catch 30 will overcome the force in the tension spring 40 with the consequence that the catch 30 is rotated in the anti-clockwise direction from a free position shown in FIG. 3A into an engagement position, shown in FIG. 3B, in a tooth gap in the central gearwheel 18. As soon as one or more of the locking catches 30 have come into locking engagement with the central gearwheel 18, it is blocked against rotating relative to the base plate 16, which allows the speed of the chuck 10 to be increased considerably without the problems mentioned above occurring.

The gearwheel and retaining mechanism described above is enclosed by a housing 42 which is mounted on the base plate 16 and on which a cover 44 (FIG. 1) is fixed. The arms 20 are located on the top side of the cover 44.

What is claimed is:

1. A device for rotation of disc-shaped elements of different diameter, which device comprises a chuck which is rotatable by means of a motor-driven spindle and in which three arms distributed evenly in the peripheral direction are pivotably mounted, the arms having a radially outer stop element for contact with an outer peripheral edge of a disc element inserted in the chuck, and the chuck having a base plate which is connected in a rotationally fixed manner to the spindle and in which each arm is mounted rotatably via a respective pin which, via a gearwheel mounted thereon, is in engagement with a central gearwheel which is mounted rotatably in the base plate and is preloaded by means of tension spring elements towards a rotational position in which the central gearwheel tends to hold the arms and their stop elements in a pivoted-in position in the chuck, the arms being synchronously pivotable towards a pivoted-out position counter to the action of the tension spring elements in order to receive and, while centering, clamp a disc element in the chuck in order for it to be possible to subject the disc element to rapid rotation therein, wherein the device further comprises a retaining mechanism which is configured to lock the rotation of the central gearwheel relative to the base plate when a predetermined speed of the chuck is reached.

2. A device according to claim 1, wherein the retaining mechanism comprises at least one retaining catch mounted in the chuck, which catch is preloaded towards a position not engaging with the central gearwheel and is arranged so as to be brought into locking engagement with the central gearwheel when the predetermined speed is exceeded.

3. A device according to claim 2, wherein the retaining catch is configured as a pivotable two-armed lever which has a first lever arm preloaded by means of a tension spring in a direction opposite to the centrifugal force, and a second lever arm which has a dog for engagement in tooth gaps of the central gearwheel, the catch being designed so as to be pivoted with its dog into locking engagement with the central gearwheel by the centrifugal force exerted on the first lever arm of the catch, counter to the action of the said tension spring, when rotation of the chuck exceeding the predetermined speed takes place.

4. A device according to claim 2, wherein three retaining catches are distributed evenly in the peripheral direction in the chuck.

* * * * *